(12) United States Patent
Borbolla et al.

(10) Patent No.: US 7,798,458 B2
(45) Date of Patent: Sep. 21, 2010

(54) DOUBLE MOUNTED DUAL SWITCH BOX BRACKET—STUD DIVIDER

(75) Inventors: Ian Rubin de la Borbolla, Memphis, TN (US); Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 731 days.

(21) Appl. No.: 11/787,002

(22) Filed: Apr. 13, 2007

(65) Prior Publication Data

US 2008/0251650 A1    Oct. 16, 2008

(51) Int. Cl.
*A47F 5/00* (2006.01)
(52) U.S. Cl. .................................. 248/300; 248/906
(58) Field of Classification Search .............. 248/481, 248/475.1, 549, 480, 484, 900, 181.1, 181.2, 248/288.31, 231.9, 27.1, 300, 544, 906; 359/871–873; 174/50, 58, 63; 220/3.3, 3.5, 3.6, 3.9; 52/317
See application file for complete search history.

(56) References Cited

U.S. PATENT DOCUMENTS

| | | | |
|---|---|---|---|
| 2,788,187 A * | 4/1957 | De Mont et al. | 248/27.1 |
| 4,135,337 A | 1/1979 | Medlin | |
| 4,572,391 A * | 2/1986 | Medlin | 220/3.9 |
| 4,603,789 A | 8/1986 | Medlin, Sr. | |
| 4,688,693 A | 8/1987 | Medlin, Jr. | |
| 4,757,908 A | 7/1988 | Medlin, Sr. | |
| 4,863,399 A * | 9/1989 | Medlin, Jr. | 439/538 |
| 5,025,944 A | 6/1991 | Rodick | |
| 5,234,119 A | 8/1993 | Jorgensen | |
| 5,263,676 A | 11/1993 | Medlin, Jr. | |
| 5,450,974 A | 9/1995 | Lippa | |
| 5,646,371 A | 7/1997 | Fabian | |
| 5,841,068 A | 11/1998 | Umstead et al. | |
| 5,965,844 A | 10/1999 | Lippa | |
| 6,147,304 A | 11/2000 | Doherty | |
| 6,452,813 B1 | 9/2002 | Gretz | |
| 6,749,162 B2 | 6/2004 | Nicolides et al. | |
| 7,053,300 B2 | 5/2006 | Denier et al. | |
| 7,109,414 B2 | 9/2006 | Reynolds | |
| 2006/0005987 A1 * | 1/2006 | Denier et al. | 174/58 |

FOREIGN PATENT DOCUMENTS

CA         2016953         3/1991

* cited by examiner

*Primary Examiner*—Gwendolyn Baxter
(74) *Attorney, Agent, or Firm*—Hoffmann & Baron, LLP (57) ABSTRACT

A double-mounted electrical box mounting bracket for mounting to a wall stud that includes: a substantially flat center section having a top surface, a bottom surface, a pair of opposing sides and one or more center mounting holes for securing the bracket to a structure; a pair of substantially flat base plates, each having a first end and a second end, an opening having a periphery for receiving an electrical box, and a bendable member extending into the opening from the periphery; a pair of offsets connecting the opposing sides of the center section and the first ends of the base plates; and a pair of substantially flat flanged ends connected to the second sides of the base plates by a pair of flange necks, wherein the base plates are offset and recessed from the center section and flanged ends.

22 Claims, 7 Drawing Sheets

FIG. 7

DOUBLE MOUNTED DUAL SWITCH BOX BRACKET—STUD DIVIDER

FIELD OF THE INVENTION

The present invention is a double mounted dual switch box bracket. In particular, the present invention relates to a double mounted dual switch box bracket that is mounted to a metal or wood wall stud.

BACKGROUND OF INVENTION

Electrical boxes are used for housing switches, receptacles and other types of electrical devices. In new building construction, electrical boxes are typically mounted to wall studs and separate boxes are used for low and high voltage devices in accordance with the applicable building and/or electrical codes. As a result, two or more electrical boxes can be mounted in fairly close proximity to accommodate the different voltages. When the electrical boxes are vertically aligned, they can easily be attached to the same wall stud. However, when it is desired to align the boxes horizontally, the mounting bracket used for one box can interfere with mounting the bracket for the second box.

The current method of attaching electrical boxes (low or high voltage) on opposing sides of a wall stud is similar to attaching just a single box. A single bracket is either screwed or clamped into place on a single side of a metal or wooden wall stud. If a bracket has a clamp (usually spring steel, etc.), placing a second electrical box directly on the opposite side from the first box becomes difficult due to the clamp taking up all of the real estate on the stud. Due to the interference of the clamp that is used to mount the first box, the second box can only be easily attached to the stud above or below the first box—but not at the same elevation. When a single bracket is screwed to the stud, an opposing box can be installed in the same plane by screwing a second bracket to the stud, often on top of or over the first bracket which can double the installation time and create an undesirable 'bump' in the final wall covering. Accordingly, there is a need for a single bracket that can mount electrical boxes on opposing sides of a wall stud. Moreover, there is a need for a double mounted dual switch box bracket that can be used to mount both low voltage and high voltage devices simultaneously.

SUMMARY OF THE INVENTION

In accordance with the present invention, a double-mounted electrical box mounting bracket is provided. The bracket includes: a substantially flat center section; a pair of substantially flat base plates, a pair of offsets; a pair of substantially flat flanged ends; and a pair of flange necks. The substantially flat center section has a top surface, a bottom surface, a pair of opposing sides and one or more center mounting holes for securing the bracket to a structure, such as a wall stud. Each of the pair of substantially flat base plates includes: a first end and a second end; a front surface and a back surface; an opening having a periphery for receiving an electrical box; one or more mounting screw apertures and/or slots for securing the electrical box to the base plate; and a bendable member extending into the opening from the periphery. The pair of offsets connects the opposing sides of the center section and the first ends of the base plates. Each of the pair of substantially flat flanged ends has a front face, a bottom face and one or more mounting holes (also referred to herein as mounting screw apertures). The flanged ends are connected to the second ends of the base plates by the pair of flange necks. Preferably, the top surface of the center section and the front faces of the opposing flanged ends are substantially in the same plane.

The base plates of the double-mounted electrical box mounting bracket are offset and recessed from the top surface of the center section and the front faces of the pair of flanged ends. In preferred embodiments, each of the pair of members that extends into the opening from the periphery of the base plate has a base which connects to the base plate and a bending aperture near the base which facilitates bending the member. Each of the pair of members can also have an aperture. In addition, each of the base plates can have a pair of sides and a side wall extending from the back surface of at least one side of the base plate. Preferably, the side wall extends beyond the first end and the second end of each base plate. In preferred embodiments, a pair of tabs extend from the bottom surface of the opposing sides of the center section. These tabs contact the sides of a wall stud when the bracket is installed.

BRIEF DESCRIPTION OF THE FIGURES

The preferred embodiments of the double mounted dual switch box bracket of the present invention, as well as other objects, features and advantages of this invention, will be apparent from the following detailed description, which is to be read in conjunction with the accompanying drawings wherein.

DETAILED DESCRIPTION OF THE INVENTION

The present invention is a double mounted dual switch box bracket that is mounted to a wall stud or similar structure so that two electrical boxes can be mounted side-by-side. The bracket includes a center section, two base plates and a pair of opposing flanged ends. The center section is connected to the first end of the base plates by a pair of offsets and the opposing flanged ends are connected to the second ends of the base plates by a pair of flange necks. The bracket allows the user to attach electrical boxes, housing a combination of low and/or high voltage devices, on opposing sides of a wall stud using only one bracket, as opposed to two separate brackets which are currently used. The opposing flanged ends of the bracket can be used to attach additional brackets for electrical boxes or they can be used to secure the bracket to another structure.

The single bracket allows base plates for two electrical boxes to be installed on either side of a wall stud using a single set of screw holes located in the center section of the bracket. Each of the two base plates includes an opening for receiving an electrical box and mounting screw apertures for mounting electrical boxes having a variety of different mounting screw configurations. The bracket also includes a side wall on at least one side of each of the base plates, which assists in keeping the bracket from bending and/or flexing. After the bracket is mounted to a wall stud, the side walls for each base plate contact the opposing sides of the stud and provide added support for the bracket. A member (also referred to herein as a "far-side support") extends from the periphery of each base plate, preferably from the flanged end side of the periphery, into the opening in the base plate. The member can have an aperture which can be used for attaching a lead string for pulling low voltage wires.

The opposing sides of the center section, where the offsets connect the center section to the base plates, can include a pair of tabs. These tabs are formed by a U-shaped aperture formed in the base plate, offset and center section. The base of the "U" is in the base plate and substantially parallel to the adjacent side of the center section. The two legs of the "U" extend thru the offsets and part way into the center section. After the aperture is made to form the tab, the tab can be bent inwardly at an angle to the center section. This angle can vary from 0 to 90 degrees depending on the dimensions of the stud and can be adjusted by the user prior to installation. For a standard metal stud, the tabs are typically bent at a 90 degree angle. For non-standard metal studs and wooden studs, the angle can vary from about 30 to about 90 degrees. Accordingly, the invention is not limited by the angle of the tabs since it can vary for different installations. When the bracket is installed on a wall stud, the tabs engage the opposing sides of the stud and keep the bracket aligned while it is attached to the stud. The bracket can be installed in any position so that it can be attached to both vertical and horizontal studs or structures.

The dual bracket can also include a member/far-side support formed in the opening of each of the base plates. Preferably, the far-side supports are stamped or cut from the material that is removed to form the opening in the base plate. As used herein, the term "far-side support" refers to a member that can be bent away from the bracket after it has been installed on a wall stud and contact the structure, typically a wall, behind the bracket. This provides additional support for the bracket and reduces the movement of the bracket when force is exerted on the front surface of the bracket, e.g., when the electrical box contains a receptacle and a plug is inserted. Typically, the walls of a structure have wall surfaces on both sides of the wall studs, such as plywood for an exterior wall or sheet rock for an interior wall. Preferably, the length of the far-side support is about the same as the width of the wall stud so that the support will contact the wall surface behind the bracket when extended.

The far-side support can have an aperture which facilitates wiring of the electrical box mounted in the bracket. After the bracket is attached to a wall stud and before the wall is installed, the first end of a string is passed through the aperture and attached to the far-side support. The second end of the string is then extended either up to the top of the wall or down through the floor and secured. Later on, when the low voltage wiring is installed, the user can tie the second end of the string to the low voltage wiring and then pull the first end of the string to bring the wire into the electrical box.

The two base plates for the bracket can have multiple mounting holes around the perimeter of the opening, preferably at or near the corners, for securing a variety of boxes with different mounting aperture arrangements to the bracket. In preferred embodiments, the base plates are offset and recessed from the surfaces of the center section and the opposing flanged ends. When the bracket is installed, it can be attached to a single stud using the mounting holes in the center section or it can be attached at the center section and one or both of the flanged ends using the mounting apertures in the flanged ends. Preferably, the bracket has a unitary construction and the center section, offsets, base plates, flanged necks and flanged ends are made by metal stamping a single piece of sheet metal. The preferred metals are galvanized or carbon steel, but the invention is in no way limited by the type of metal that is used. Moreover, the bracket can also be made from a hard plastic material such as HDPE or nylon and is not limited to a metal construction.

The base plates of the bracket can have diagonally spaced mud ring mounting holes (substantially round holes—not keyholes or slots) that are used to mount a mud ring to the base plates without also having to first mount an electrical box and then mount the mud rings to the electrical box. In many low voltage applications, the electrical and building codes do not require an electrical device to be housed in an electrical box. In these instances, the electrical device can be mounted to a mud ring that is attached to the bracket. Therefore, the base plates are provided with mud ring mounting holes which allow a mud ring to be mounted directly to the base plate. As used herein, the term "mud ring" refers to a substantially flat sheet of metal that fits over the opening in the base plate and has an opening that is smaller then the base plate opening. The mud ring can have a variety of different mounting screw apertures for installing different types of electrical devices. Typically, the mud ring is used to attach an electrical fixture to the bracket.

Figure 1:
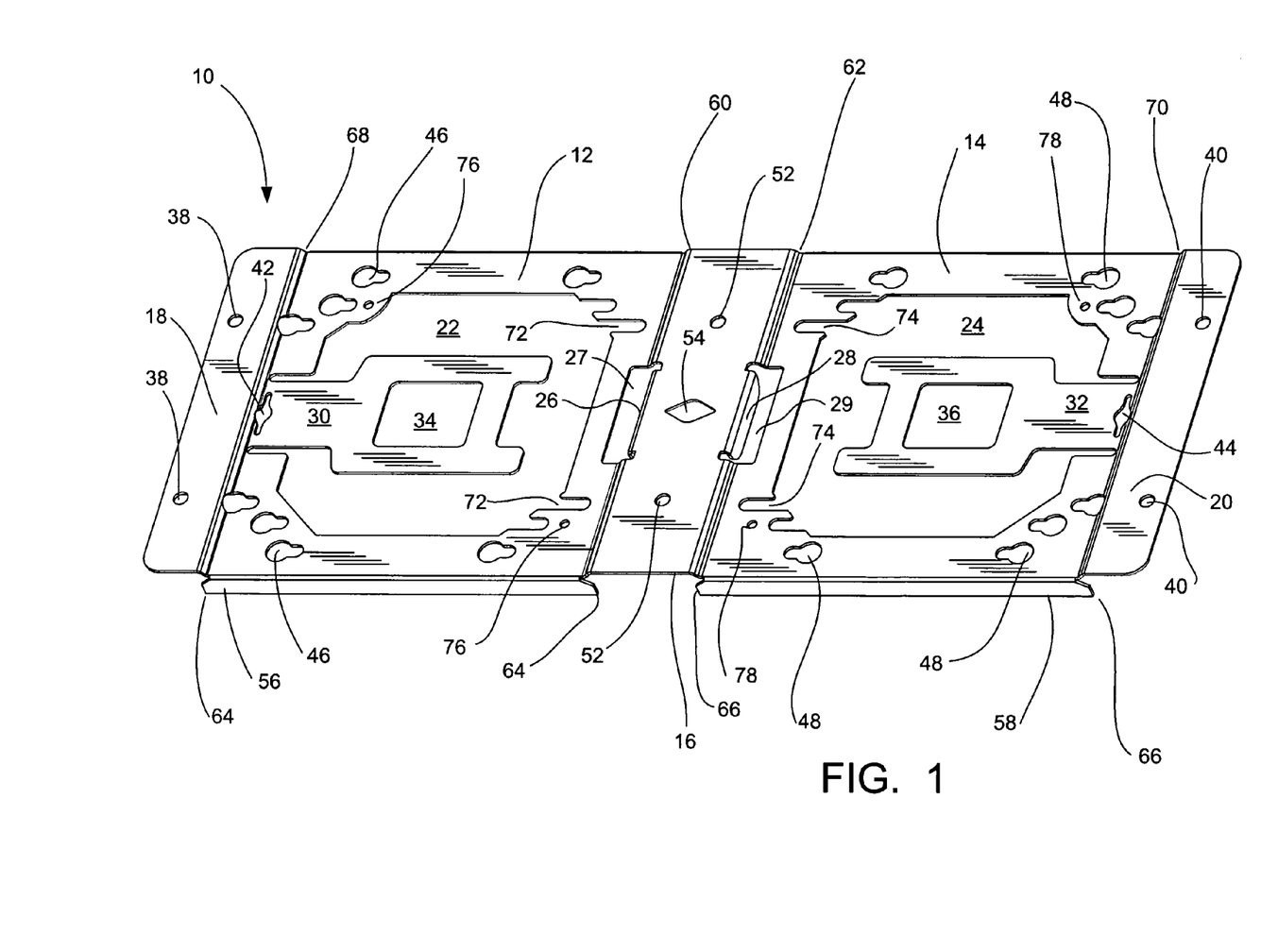
FIG. 1 is a perspective view of an embodiment of the double mounted dual switch box bracket.

Referring now to the drawings, FIG. 1 shows a preferred embodiment of the double-mounted dual switch box bracket 10 (also referred to herein as "the bracket"). The bracket 10 has two substantially flat base plates 12, 14 connected by a center section 16 with a substantially flat surface that is offset from the surfaces of the base plates 12, 14 by a pair of offsets 60, 62. The center section 16 has a pair of tabs 26, 28 located near the midsections of the offsets 60, 62 which extend downwardly from the top surface of the bracket 10. These tabs 26, 28 are formed by U-shaped apertures 27, 29 in the base plates 12, 14, offsets 60, 62 and center section 16. When the bracket 10 is attached to a metal stud 90 (see FIGS. 3 and 4), the tabs 26, 28 engage the opposing sides of the metal stud 90. The tabs 26, 28 are bendable so that they can be adjusted by the user (e.g., with a pliers) to fit the stud 90. The center section 16 also has a diamond-shaped center locator aperture 54 for positioning the bracket 10 on a metal stud 90 and two mounting holes 52 for attaching the bracket 10 to the metal stud 90.

The two base plates 12, 14 are connected on one end to the center section 16 by offsets 60, 62 and on the other end the base plates 12, 14 are connected to a pair of flanged ends 18, 20 by flange necks 68, 70. The surfaces of the flanged ends 18, 20 are substantially flat and are preferably in the same plane as the surface of the center section 16. The flanged ends 18, 20 have one or more mounting screw apertures 38, 40 which can be used to attach the bracket 10 to a structure or for attaching additional brackets (not shown). The base plates 12, 14 have openings 22, 24 for receiving electrical boxes 92 (see FIGS. 3 and 4) and a plurality of slots 72, 74 and/or keyhole apertures 46, 48 for securing the box 92 to the base plates 12, 14. The base plates 12, 14 have mounting screw apertures 76, 78 for mounting electrical boxes 92. The slots 72, 74 and/or keyhole apertures 46, 48 in the base plates 12, 14 can accommodate electrical boxes 92 with a variety of different mounting aperture configurations. This allows one bracket 10 to be compatible with different types and sizes of boxes 92 and boxes 92 made by different manufacturers.

The base plates 12, 14 can each have a far-side support 30, 32 extending preferably from the flanged ends 18, 20 into the openings 22, 24. The far-side supports 30, 32 are bendable which allows them to be rotated at their base up to about 90 degrees or more when electrical boxes 92 are inserted into the openings 22, 24. The bases of the far-side supports 30, 32, where they connect to the flange necks 68, 70 can have bending apertures 42, 44 that facilitate bending the far-side supports 30, 32. The bracket 10 in FIG. 1 shows the far-side supports 30, 32 with apertures 34, 36 that can be used for attaching a string for pulling wires into the electrical box 92 mounted in the openings 22, 24. The apertures 34, 36 also allow the openings in the side of the electrical boxes 92 to be more easily accessed.

At least one of the sides of the base plates 12, 14 can have a side wall 56, 58 which acts as a stiffening member and limits flexing and bending of the base plates 12, 14. The side walls 56, 58 extend from the back surface of the base plates 12, 14 and the opposing ends 64, 66 of the side walls 56, 58 extend beyond the ends of the base plates 12, 14. When the bracket 10 is attached to a metal stud 90, the opposing ends 64, 66 contact the sides of the metal stud 90 to provide additional stability. Offsets 60, 62 do not contact the stud 90.

Figure 2:
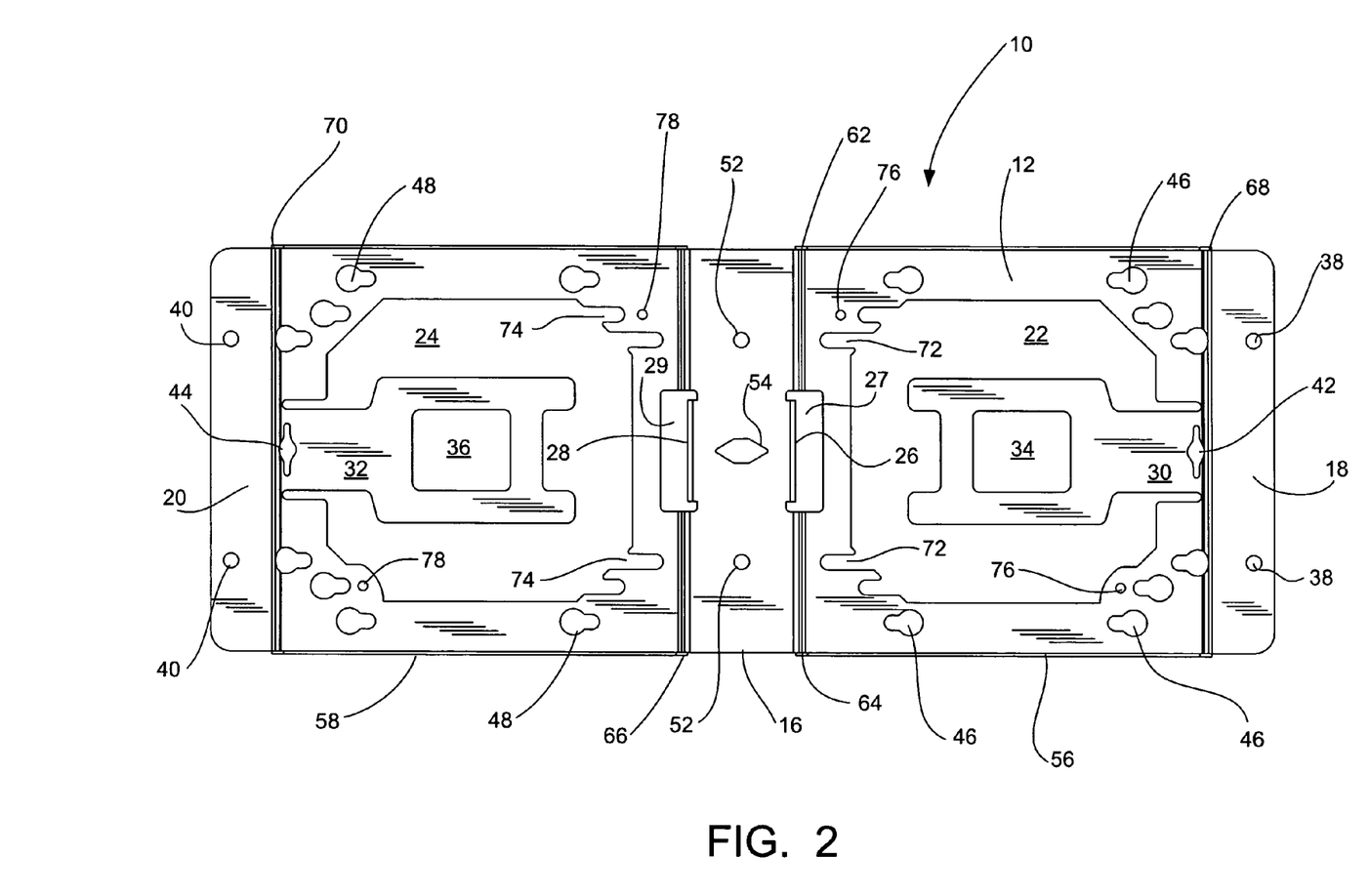
FIG. 2 is a bottom view of an embodiment of the double mounted dual switch box bracket.

FIG. 2 is a bottom view of an embodiment of the double mounted dual switch box bracket 10. The two base plates 12, 14 have side walls 56, 58 (preferably on opposite sides of both base plates 12, 14) that assist in stiffening the bracket 10 and limiting flexing. The tabs 26, 28 extend from the back side of the center section 16 and engage the side walls of a metal stud 90 (see FIG. 3) when the bracket 10 is installed on the metal stud 90. In addition, the ends 64, 66 of the side walls 56, 58 also contact the metal stud 90.

Figure 3:
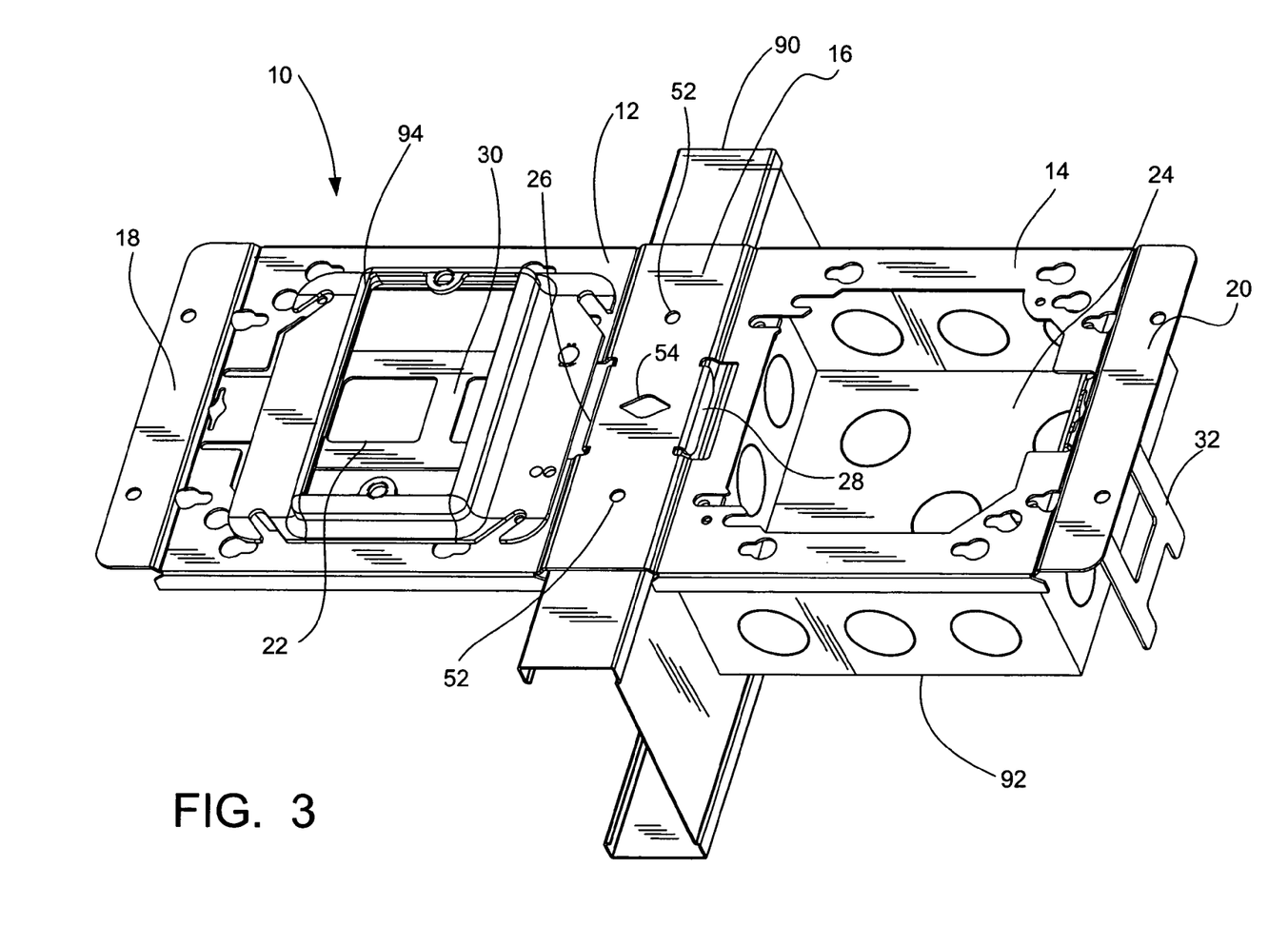
FIG. 3 is a perspective view of an embodiment of the double mounted dual switch box bracket mounted to a metal wall stud.

FIG. 3 shows an embodiment of the double mounted dual switch box bracket 10 mounted to a metal wall stud 90. The center locator aperture 54 located in the middle of the center section 16 is used to position the bracket 10 on the metal stud 90, typically by aligning the center locator aperture 54 with a horizontal and/or vertical line drawn on the metal stud 90. After the bracket 10 is properly aligned, it is pushed against the metal stud 90 so that the tabs 26, 28 on either side of the center section 16 engage the sides of the metal stud 90. Screws or other fastening means are then inserted in the two mounting holes 52 in the center section 16 to secure the bracket 10 to the metal stud 90.

FIG. 3 also illustrates how the bracket 10 can accommodate an electrical box 92 mounted in one base plate 14 and a mud ring 94 mounted in the other base plate 12. When an electrical box 92 is installed in one of the base plates 14, the far-side support 32 is bent approximately 90 degrees to allow the box 92 to be inserted into the opening 24. When a mud ring 94 is attached to the other base plate 12, the far-side support 30 may not have to be bent, depending on the device that is installed on the mud ring 94.

Figure 4:
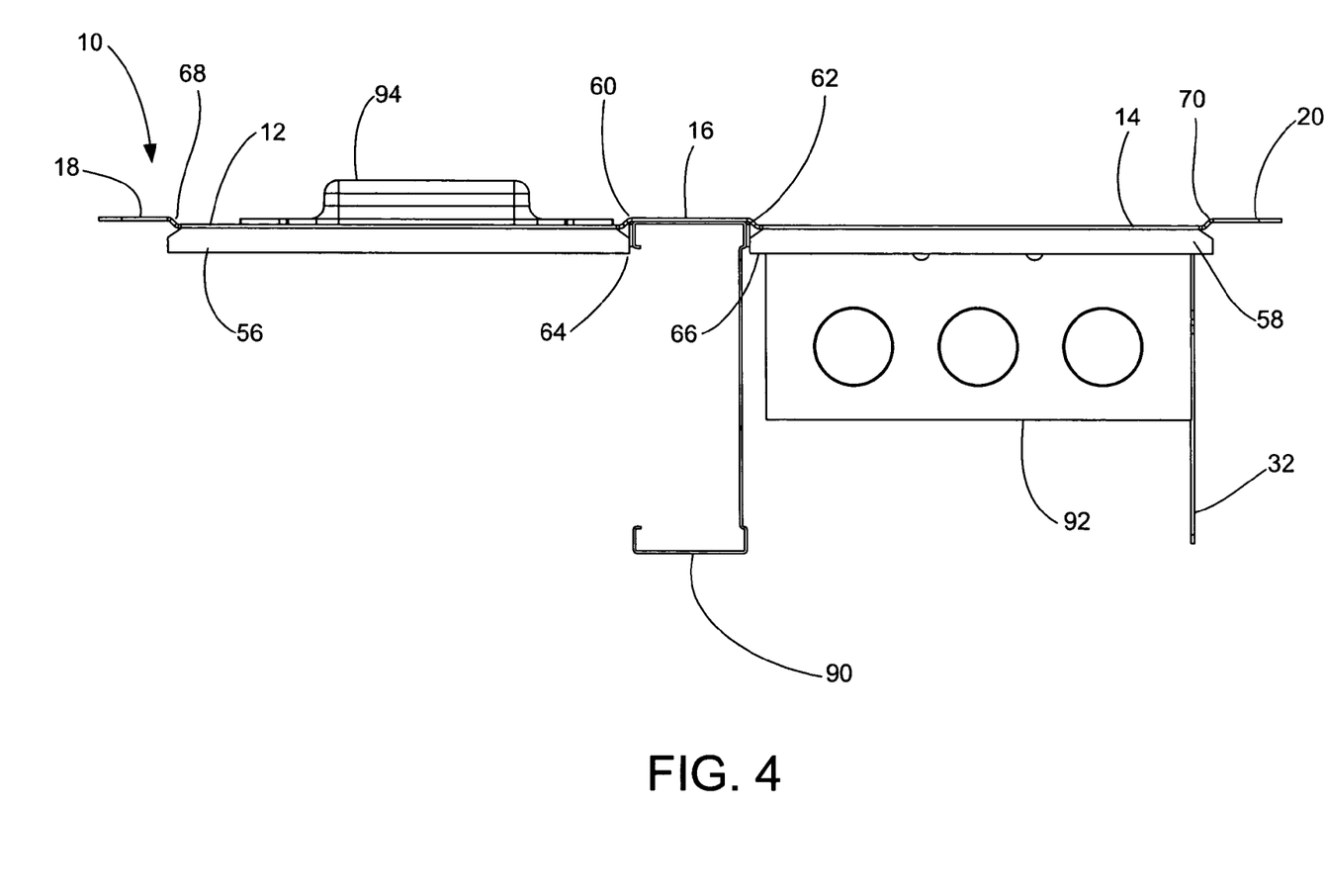
FIG. 4 is a side view of an embodiment of the double mounted dual switch box bracket mounted to a metal wall stud.
Figure 5:
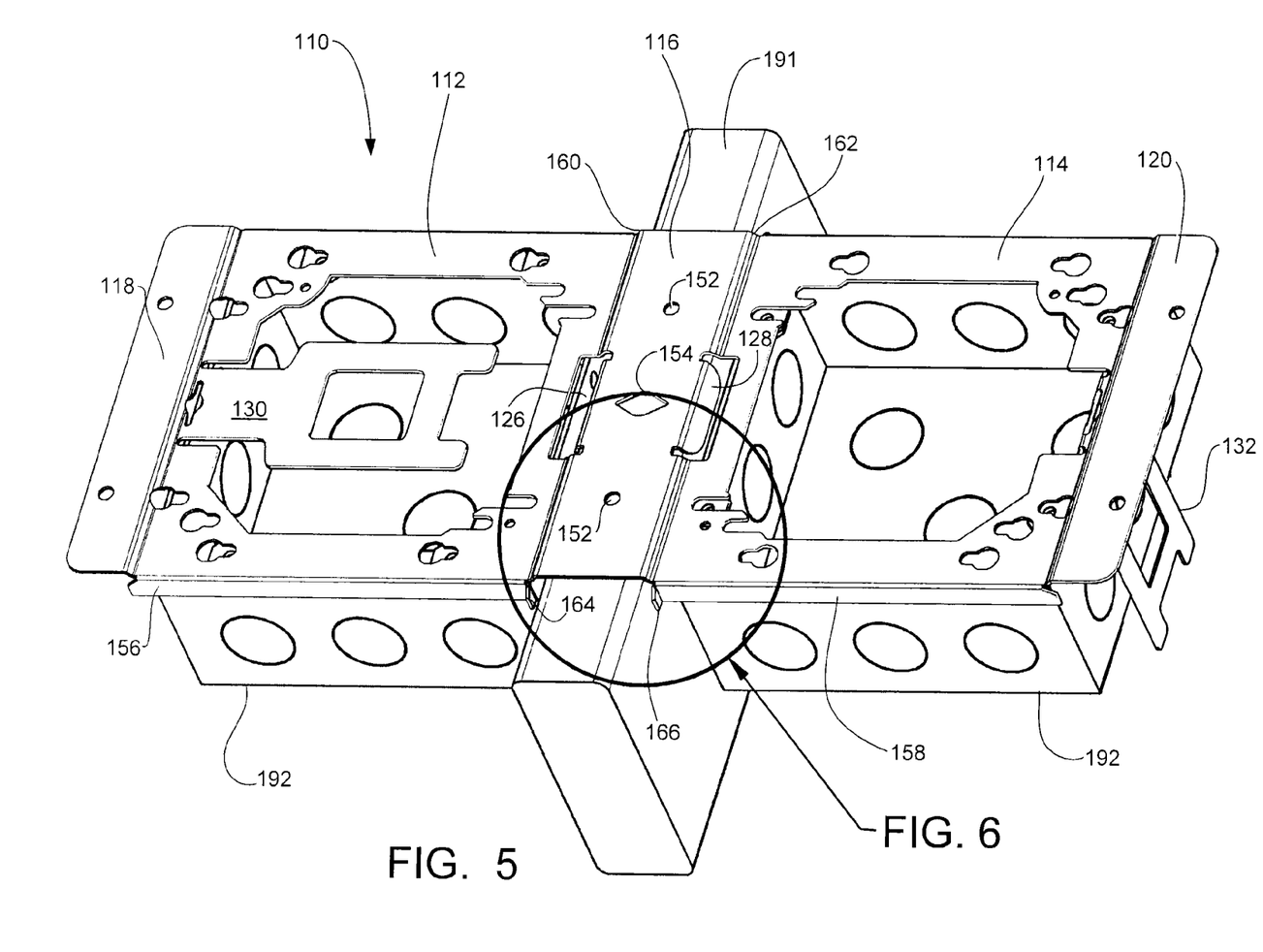
FIG. 5 is a perspective view of an embodiment of the double mounted dual switch box bracket mounted to a wooden wall stud.
Figure 6:
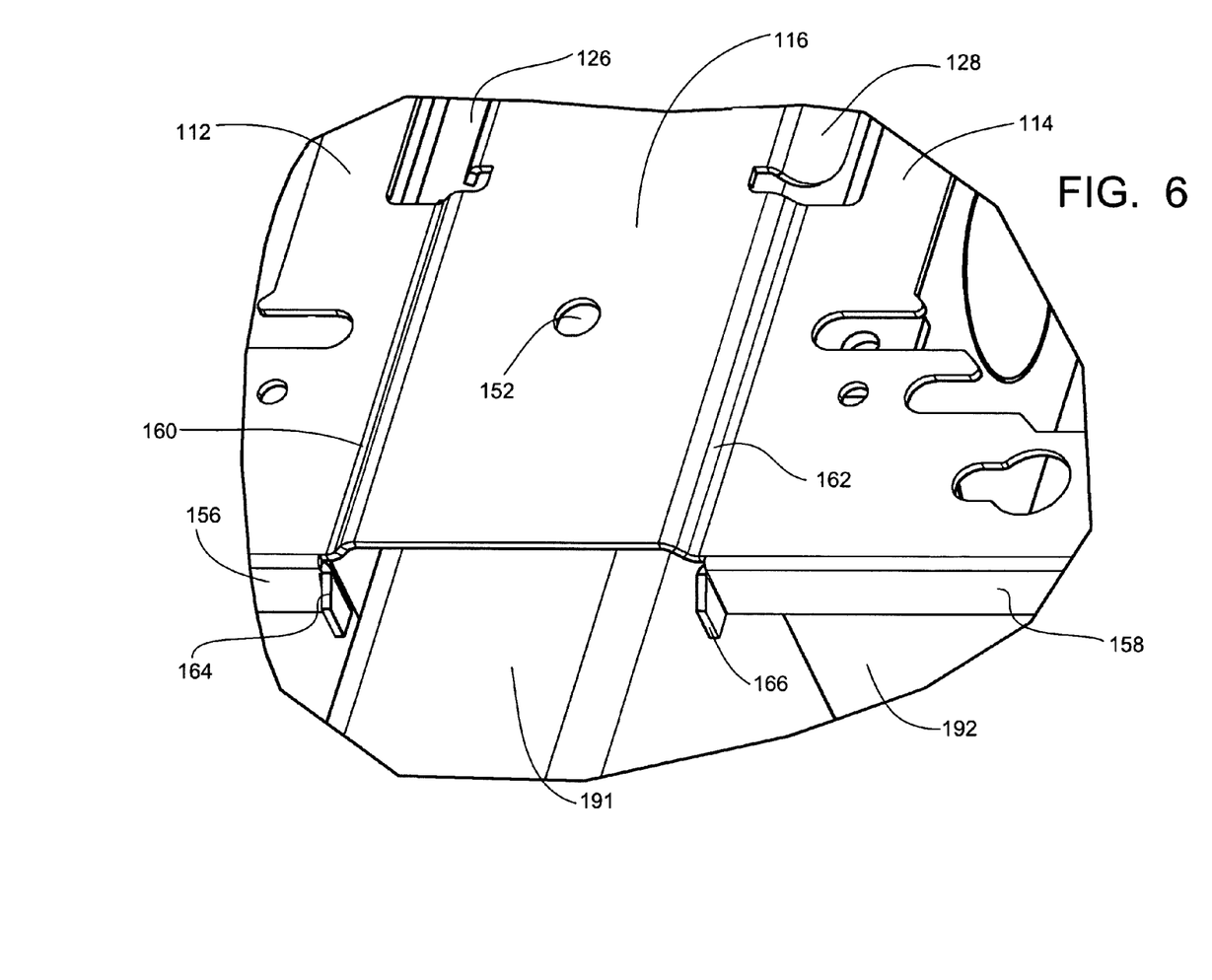
FIG. 6 is a detail view of the side walls of an embodiment of the double mounted dual switch box bracket contacting a wooden wall stud.
Figure 7:
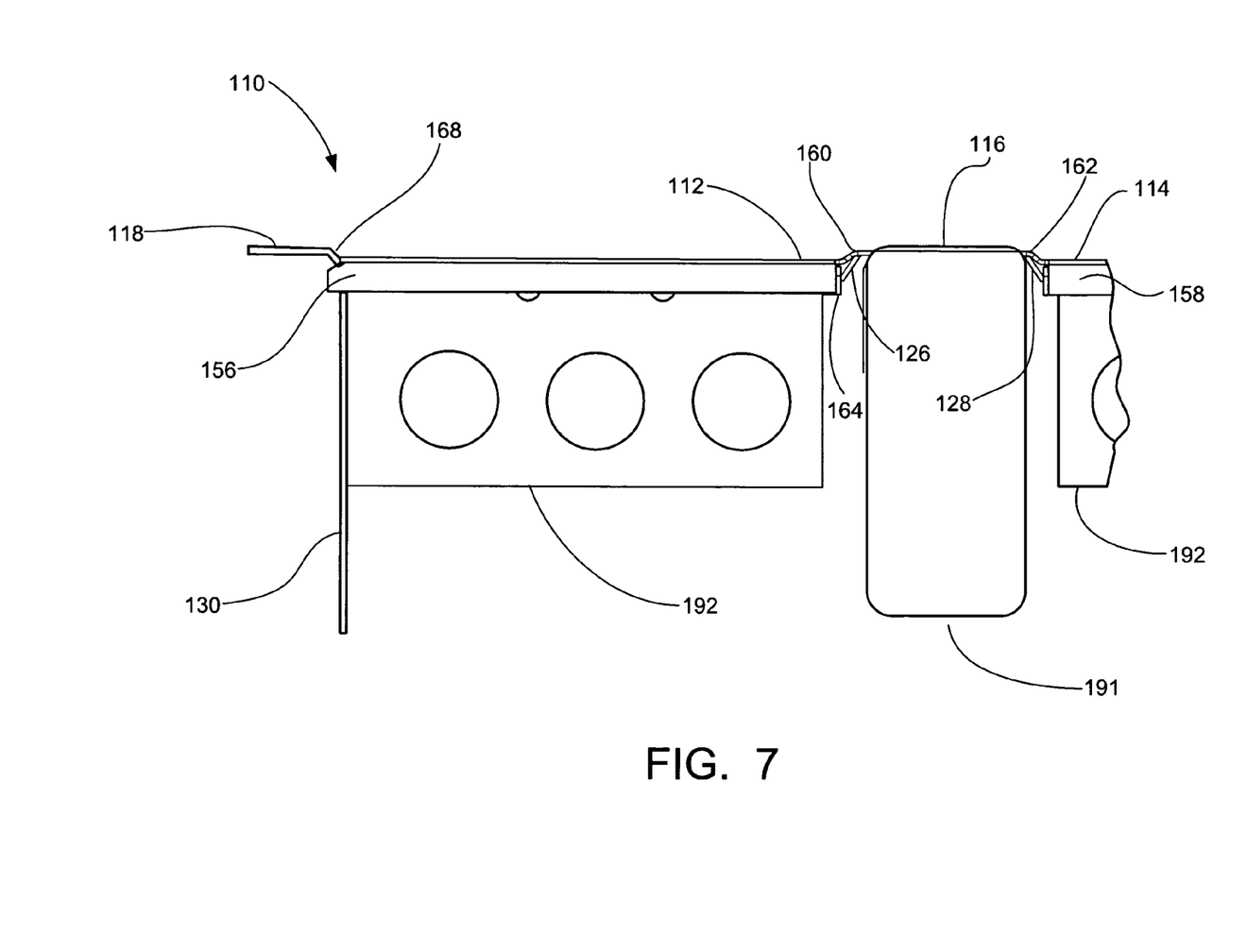
FIG. 7 is a side view of an embodiment of the double mounted dual switch box bracket mounted to a wooden wall stud.

FIG. 4 shows a side view of an embodiment of the double mounted dual switch box bracket 10 mounted to a metal wall stud 90. Although a metal wall stud 90 is shown, the bracket 10 can also be mounted to supports made of wood or composite materials (as shown in FIGS. 5-7). The center section 16 of the bracket 10 is attached to the metal stud 90 and the ends 64, 66 of the side walls 56, 58 contact the sides of the metal stud 90 to provide added support. The flanged ends 18, 20 of the bracket 10 can be attached to other structural supports (not shown) for additional support or the flanged ends 18, 20 can be used to attach additional brackets (not shown). The far-side support 32 can extend a distance from the base plate 14 that is about equal to the width of the metal stud 90. Therefore, when a wall (not shown) is installed on the side of the metal stud 90 opposing the bracket 10, the extended far-side support 32 can contact the wall and provide additional support and stability for the bracket 10.

FIG. 5 shows an embodiment of the double mounted dual switch box bracket 110 mounted to a wooden wall stud 191. The two base plates 112, 114 are connected on one end to the center section 116 by offsets 160, 162 and on the other end the base plates 112, 114 are connected to a pair of flanged ends 118, 120. The embodiment for the wooden wall stud 191 is different from the embodiment for the metal wall stud 190 (see FIGS. 1-4) in that the offsets 160, 162 do not contact the sides of the wooden stud 191 (see FIG. 7). The center section 116 has a pair of mounting holes 152 to secure the bracket 110 to the wood stud 191 and a center locator aperture 154, which is located in the middle of the center section 116 and is used to position the bracket 110 on the wood stud 191. The base plates 112, 114 each have a far-side support 130, 132 extending from the flanged ends 118, 120. The side walls 156, 158 extend from the base plates 112, 114 and have opposing ends 164, 166, which are bent to contact the side of the wooden stud 191.

FIG. 5 is substantially the same as FIG. 3, except that two electrical boxes 192 are installed in the bracket 110 and the bracket 110 is mounted to a wooden stud 191, instead of a metal stud 90 (see FIG. 3). Typically, wooden studs 191 are wider than metal studs 90. When the bracket 110 is installed on a wooden stud 191, the tabs 126, 128 and the opposing ends 164, 166 of the side walls 156, 158 engage the wooden stud 191 in a different manner. First, the offsets 160, 162 do not contact the wooden stud 191 (see FIG. 7) and second, the tabs 126, 128 are not bent inwardly so that they are substantially parallel to each other. Instead, the tabs 126, 128 are bent less than 90 degrees and they contact the shoulder of the stud 191 as well as the side surface. If necessary, the user can bend the tabs 126, 128 so that they snugly fit on either side of the stud 191. When there is not enough clearance for the wooden stud 191 to be inserted between the two opposing ends 164, 166, the user can bend back the two opposing ends 164, 166 as shown in FIG. 5 (and the detail in FIG. 6) to provide additional clearance.

FIG. 6 is a detail view of the side walls 156, 158 and one of their opposing ends 164, 166 of the double mounted dual switch box bracket 110 contacting a wooden wall stud 191. The opposing ends 164, 166 of the side walls 156, 158 are bent back so that the wooden stud 191 can fit between them. The bent back opposing ends 164, 166 then fit snugly against the sides of the wooden stud 191 and provide additional support for the bracket 110.

FIG. 7 shows a side view of the left hand side of the double mounted dual switch box bracket 110 shown in FIG. 5. An electrical box 192 is mounted to the base plate 112 and recessed from the surface of the flanged end 118 and center section 116 by the flange neck 168 and offset 160. The bent back opposing ends 164, 166 engage the side walls of the stud 191 and the center section 116 of the bracket 110 is positioned flush against the stud 191. The offsets 160, 162 that connect the center section 116 to the base plates 112, 114 do not contact the wooden stud 191. This allows the bracket 110 to fit wood studs 191 of different widths by bending the tabs 126, 128 and the opposing ends 164, 166 to provide support.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A double-mounted electrical box mounting bracket comprising:
   a substantially flat center section having a top surface, a bottom surface, opposing sides and one or more center mounting holes for securing the bracket to a structure;
   a pair of substantially flat base plates, wherein each base plate comprises a front surface and a back surface;
      a first end and a second end, wherein the first end is connected to one of the opposing sides of the center section;
      a pair of sides;
      a side wall extending from the back surface of at least one side, wherein the side wall extends beyond the first end and the second end and is adapted to contact the structure to which the bracket is secured;
      an opening having a periphery for receiving an electrical box; and
      one or more mounting screw apertures and/or slots for securing the electrical box to the base plate; and
   a pair of substantially flat flanged ends, wherein each flanged end has a front face, a bottom face and one or more mounting holes, and wherein the flanged ends are connected to the second ends of the base plates.

2. The double-mounted electrical box mounting bracket according to claim 1, wherein the base plates are offset and recessed from the top surface of the center section and the front faces of the pair of flanged ends.

3. The double-mounted electrical box mounting bracket according to claim 1, wherein each base plate further comprises a bendable member extending into the opening from the periphery.

4. The double-mounted electrical box mounting bracket according to claim 3, wherein each of the pair of members has an aperture.

5. The double-mounted electrical box mounting bracket according to claim 3, wherein each of the pair of members has a base which connects to the base plate and a bending aperture near the base which facilitates bending the member.

6. The double-mounted electrical box mounting bracket according to claim 1, wherein the opposing sides of the center section are connected to the first ends of the base plates by a pair of offsets.

7. The double-mounted electrical box mounting bracket according to claim 1, wherein a pair of tabs extend from the bottom surface of the opposing sides of the center section.

8. The double-mounted electrical box mounting bracket according to claim 1, wherein the second ends of the base plates are connected to the flanged ends by a pair of flange necks.

9. The double-mounted electrical box mounting bracket according to claim 1, wherein the top surface of the center section and the front faces of the opposing flanged ends are substantially in the same plane.

10. The double-mounted electrical box mounting bracket according to claim 1, wherein each of the flanged ends has one or more mounting screw apertures.

11. A double-mounted electrical box mounting bracket comprising:
    a substantially flat center section having a top surface, a bottom surface, a pair of opposing sides and one or more center mounting holes for securing the bracket to a structure;
    a pair of substantially flat base plates, wherein each base plate comprises:
       a first end and a second end;
       a front surface and a back surface;
       an opening having a periphery for receiving an electrical box;
       one or more mounting screw apertures and/or slots for securing the electrical box to the base plate; and
       a bendable member extending into the opening from the periphery;
    a pair of offsets, wherein the offsets connect the opposing sides of the center section and the first ends of the base plates;
    a pair of substantially flat flanged ends, wherein each flanged end has a top face, a bottom face and one or more mounting holes; and
    a pair of flange necks, wherein the flange necks connect the second ends of the base plates and the flanged ends.

12. The double-mounted electrical box mounting bracket according to claim 11, wherein the base plates are offset and recessed from the top surface of the center section and the front faces of the pair of flanged ends.

13. The double-mounted electrical box mounting bracket according to claim 11, wherein each of the pair of members has an aperture.

14. The double-mounted electrical box mounting bracket according to claim 11, wherein each of the pair of members has a base which connects to the base plate and a bending aperture near the base which facilitates bending the member.

15. The double-mounted electrical box mounting bracket according to claim 11, wherein each of the base plates has a pair of sides, and wherein a side wall extends from the back surface of at least one side of each base plate.

16. The double-mounted electrical box mounting bracket according to claim 11, wherein the side wall extends beyond the first end and the second end of each base plate.

17. The double-mounted electrical box mounting bracket according to claim 11, wherein a pair of tabs extend from the bottom surface of the opposing sides of the center section.

18. The double-mounted electrical box mounting bracket according to claim 11, wherein the top surface of the center section and the front faces of the opposing flanged ends are substantially in the same plane.

19. The double-mounted electrical box mounting bracket according to claim 11, wherein each of the flanged ends has one or more mounting screw apertures.

20. A double-mounted electrical box mounting bracket comprising:
    a substantially flat center section having a top surface, a bottom surface, a pair of opposing sides and one or more center mounting holes for securing the bracket to a structure;
    a pair of substantially flat base plates, wherein each base plate comprises:
       a first end, a second end and a pair of sides;
       a front surface and a back surface;
       a side wall extending from the back surface of at least one side and having opposing ends, wherein the opposing ends extend beyond the first end and the second end of the base plate;
       an opening having a periphery for receiving an electrical box;
       one or more mounting screw apertures and/or slots for securing the electrical box to the base plate; and
       a bendable member extending into the opening from the periphery;

a pair of offsets, wherein the offsets connect the opposing sides of the center section and the first ends of the base plates;

a pair of substantially flat flanged ends, wherein each flanged end has a top face, a bottom face and one or more mounting holes; and a pair of flange necks, wherein the flange necks connect the second ends of the base plates and the flanged ends.

21. The double-mounted electrical box mounting bracket according to claim 20, wherein a pair of tabs extend from the bottom surface of the opposing sides of the center section.

22. The double-mounted electrical box mounting bracket according to claim 20, wherein each of the flanged ends has one or more mounting screw apertures.

* * * * *